US012167252B2

(12) United States Patent
Raghavan et al.

(10) Patent No.: US 12,167,252 B2
(45) Date of Patent: Dec. 10, 2024

(54) BEAMFORMING ARCHITECTURE CAPABILITY SIGNALING

(71) Applicant: QUALCOMM Incorporated, San Diego, CA (US)

(72) Inventors: Vasanthan Raghavan, West Windsor Township, NJ (US); Junyi Li, Fairless Hills, PA (US); Mohammad Ali Tassoudji, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/456,296

(22) Filed: Nov. 23, 2021

(65) Prior Publication Data

US 2023/0164581 A1    May 25, 2023

(51) Int. Cl.
*H04W 16/28*  (2009.01)
*H01Q 1/24*  (2006.01)
*H04B 7/06*  (2006.01)
*H01Q 21/06*  (2006.01)

(52) U.S. Cl.
CPC ............ *H04W 16/28* (2013.01); *H01Q 1/246* (2013.01); *H04B 7/0617* (2013.01); *H01Q 21/065* (2013.01)

(58) Field of Classification Search
CPC ..... H04W 16/28; H01Q 1/246; H01Q 21/065; H01Q 3/40; H01Q 25/00; H04B 7/0617; H04B 7/0628; H04B 7/06956; H04B 7/0691; H04B 7/088
See application file for complete search history.

(56) References Cited

U.S. PATENT DOCUMENTS

2020/0229008 A1* 7/2020 Islam ................... H04L 1/0026
2022/0264312 A1* 8/2022 Furuichi ............... H04W 16/28
2023/0043847 A1* 2/2023 Haustein ........... H04B 7/06966

* cited by examiner

*Primary Examiner* — Fred A Casca
(74) *Attorney, Agent, or Firm* — QUALCOMM Incorporated

(57) ABSTRACT

Various aspects of the present disclosure generally relate to wireless communication. In some aspects, a network device may transmit, to a base station, an indication of a capability of a beamforming architecture of the network device. The network device may communicate with the base station based at least in part on the capability of the beamforming architecture of the network device. Numerous other aspects are described.

30 Claims, 11 Drawing Sheets

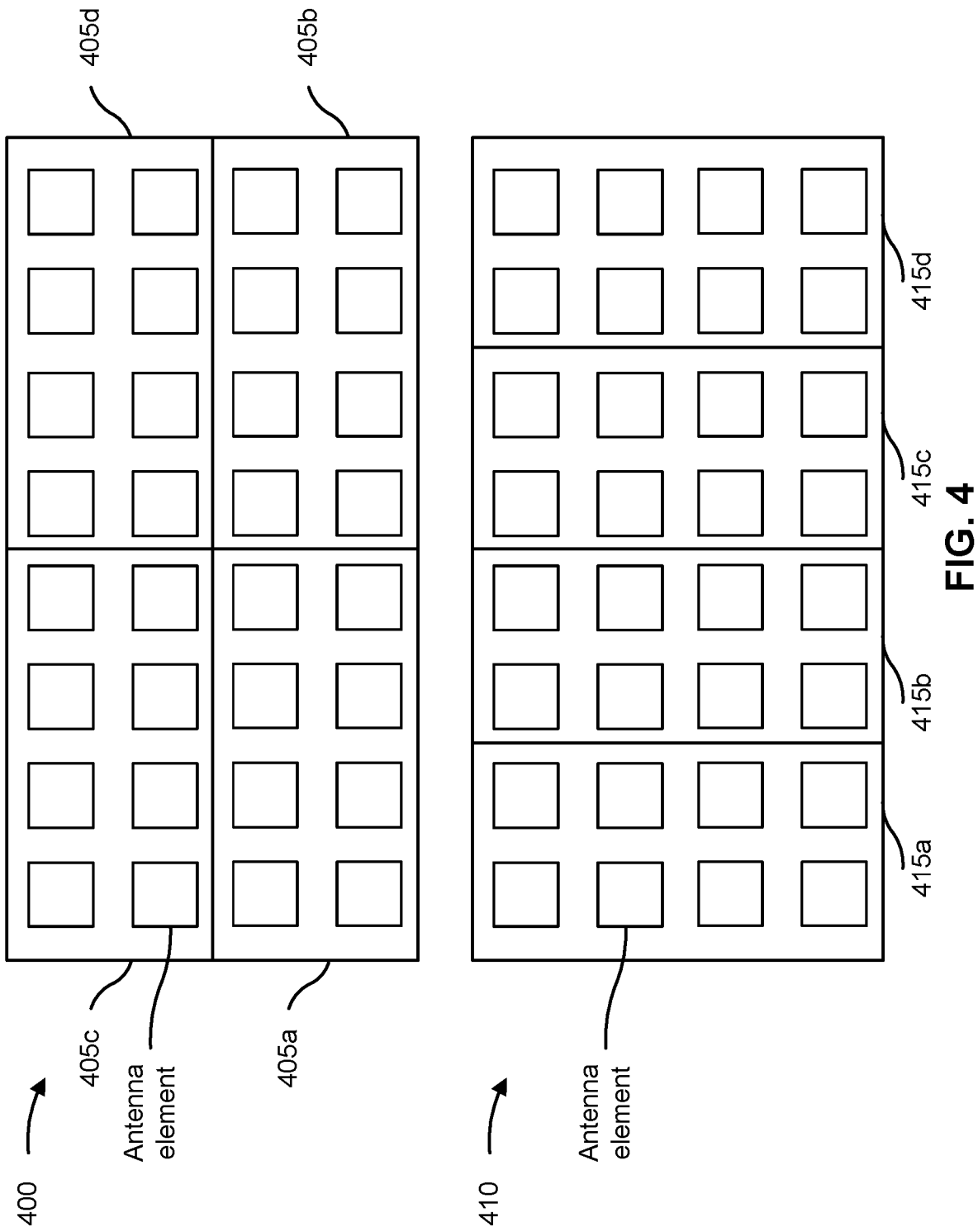

BEAMFORMING ARCHITECTURE CAPABILITY SIGNALING

FIELD OF THE DISCLOSURE

Aspects of the present disclosure generally relate to wireless communication and to techniques and apparatuses for beamforming architecture capability signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-5 are diagrams illustrating examples associated with beamforming architecture configurations for a network device, in accordance with the present disclosure

SUMMARY

Figure 1:
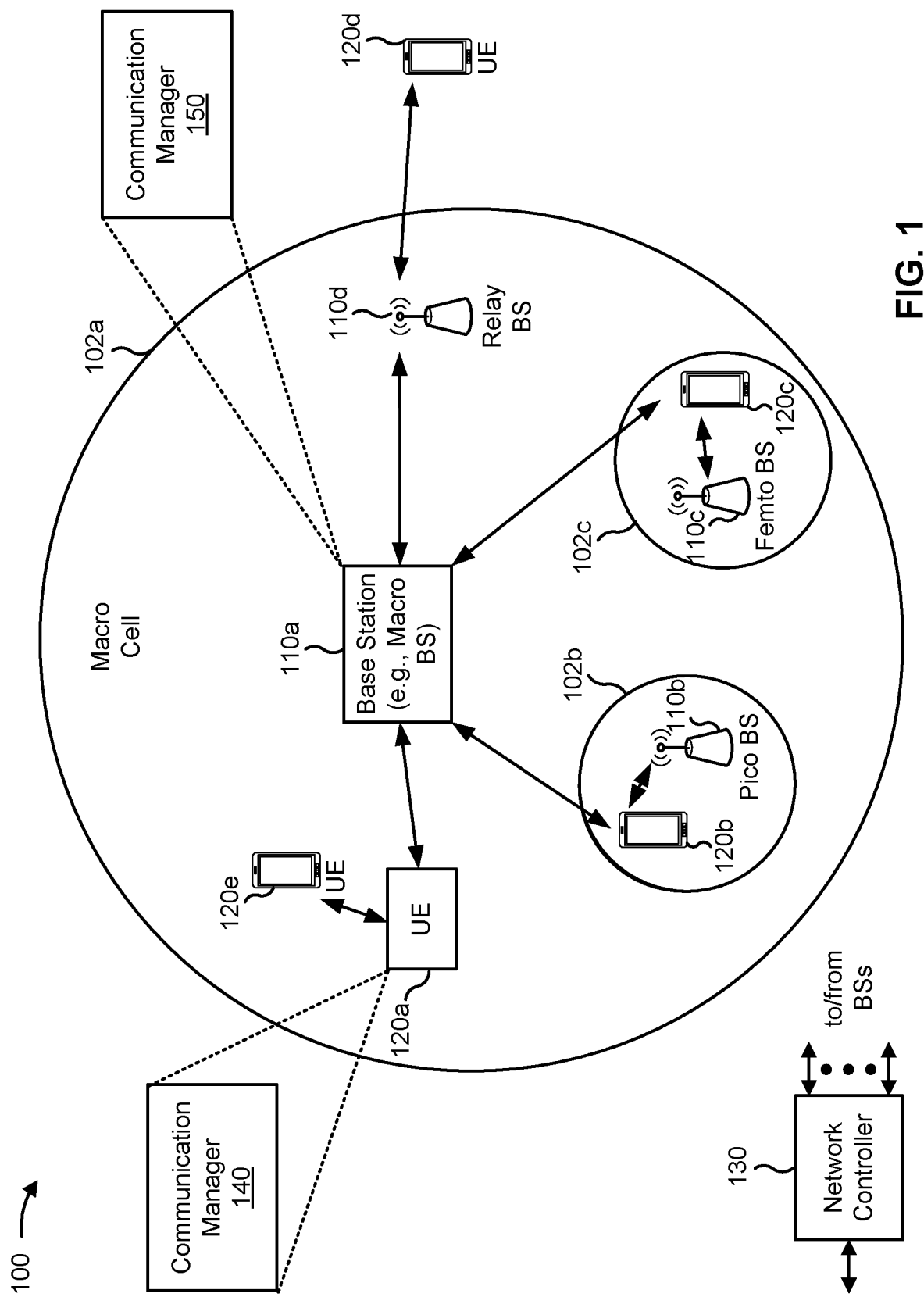
FIG. 1 is a diagram illustrating an example of a wireless network, in accordance with the present disclosure.

Some aspects described herein relate to a network device for wireless communication. The network device may include a memory and one or more processors coupled to the memory. The one or more processors may be configured to transmit, to a base station, an indication of a capability of a beamforming architecture of the network device. The one or more processors may be configured to communicate with the base station based at least in part on the capability of the beamforming architecture of the network device.

Some aspects described herein relate to a base station for wireless communication. The base station may include a memory and one or more processors coupled to the memory. The one or more processors may be configured to receive, from a network device, an indication of a capability of a beamforming architecture of the network device. The one or more processors may be configured to communicate with the network device based at least in part on the capability of the beamforming architecture of the network device.

Some aspects described herein relate to a method of wireless communication performed by a network device. The method may include transmitting, to a base station, an indication of a capability of a beamforming architecture of the network device. The method may include communicating with the base station based at least in part on the capability of the beamforming architecture of the network device.

Some aspects described herein relate to a method of wireless communication performed by a base station. The method may include receiving, from a network device, an indication of a capability of a beamforming architecture of the network device. The method may include communicating with the network device based at least in part on the capability of the beamforming architecture of the network device.

Some aspects described herein relate to a non-transitory computer-readable medium that stores a set of instructions for wireless communication by a network device. The set of instructions, when executed by one or more processors of the network device, may cause the network device to transmit, to a base station, an indication of a capability of a beamforming architecture of the network device. The set of instructions, when executed by one or more processors of the network device, may cause the network device to communicate with the base station based at least in part on the capability of the beamforming architecture of the network device.

Some aspects described herein relate to a non-transitory computer-readable medium that stores a set of instructions for wireless communication by a base station. The set of instructions, when executed by one or more processors of the base station, may cause the base station to receive, from a network device, an indication of a capability of a beamforming architecture of the network device. The set of instructions, when executed by one or more processors of the base station, may cause the base station to communicate with the network device based at least in part on the capability of the beamforming architecture of the network device.

Some aspects described herein relate to an apparatus for wireless communication. The apparatus may include means for transmitting, to a base station, an indication of a capability of a beamforming architecture. The apparatus may include means for communicating with the base station based at least in part on the capability of the beamforming architecture.

Some aspects described herein relate to an apparatus for wireless communication. The apparatus may include means for receiving, from a network device, an indication of a capability of a beamforming architecture of the network device. The apparatus may include means for communicating with the network device based at least in part on the capability of the beamforming architecture of the network device.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a base station, an indication of a capability of a beamforming architecture of the network device; and communicate with the base station based at least in part on the capability of the beamforming architecture of the network device. Additionally, or alternatively, the communication manager 140 may perform one or more other operations described herein.

In some aspects, the base station 110 may include a communication manager 150. As described in more detail elsewhere herein, the communication manager 150 may receive, from a network device, an indication of a capability of a beamforming architecture of the network device; and communicate with the network device based at least in part on the capability of the beamforming architecture of the network device. Additionally, or alternatively, the communication manager 150 may perform one or more other operations described herein.

As indicated above, FIG. 1 is provided as an example. Other examples may differ from what is described with regard to FIG. 1.

Figure 2:
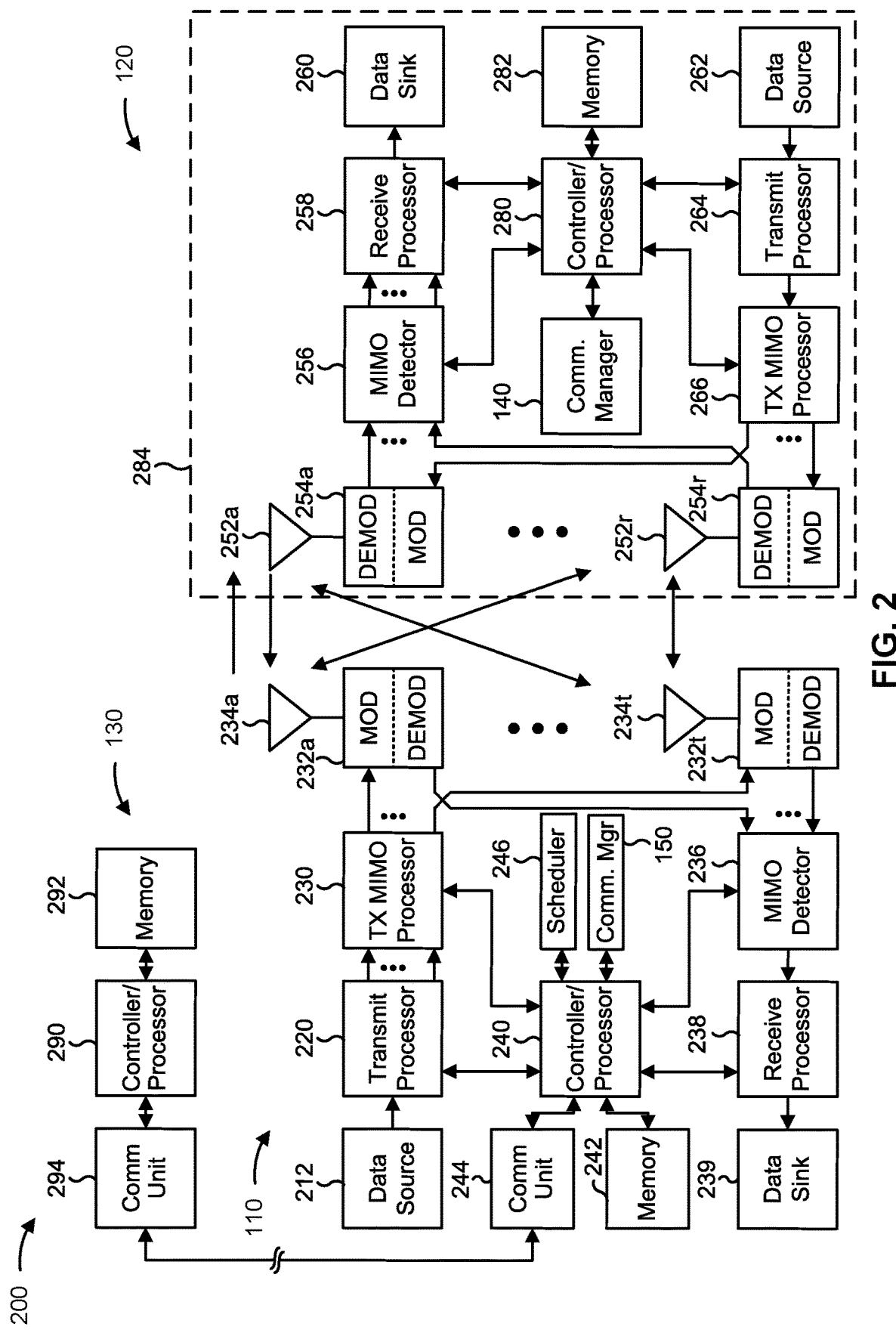
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with beamforming architecture capability signaling, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples. In some aspects, the network device described herein is the UE 120, is included in the UE 120, or includes one or more components of the UE 120 shown in FIG. 2. In some aspects, the network device described herein is the base station 110, is included in the base station 110, or includes one or more components of the base station 110 shown in FIG. 2.

In some aspects, the network device includes means for transmitting, to a base station, an indication of a capability of a beamforming architecture of the network device; and/or means for communicating with the base station based at least in part on the capability of the beamforming architecture of the network device. In some aspects, the means for the network device to perform operations described herein may include, for example, one or more of communication manager 140, antenna 252, modem 254, MIMO detector 256, receive processor 258, transmit processor 264, TX MIMO processor 266, controller/processor 280, or memory 282. In some aspects, the means for the network device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for receiving, from a network device, an indication of a capability of a beamforming architecture of the network device; and/or means for communicating with the network device based at least in part on the capability of the beamforming architecture of the network device. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In millimeter wave systems, such as FR2 and higher frequency bands (e.g., FR4 and/or FR5), base stations, UEs, and other network devices often use multiple antennas. Beamforming from multiple antennas may be used to bridge a link budget in such millimeter wave systems. In some examples, a network device (e.g., a UE, a base station, and/or another network device) may be equipped with multiple antenna modules/panels having a set of antenna elements that can be co-phased to perform beamforming. For example, the use of multiple antenna modules may enable a network device to meet spherical coverage requirements with or without hand/body blockage, and may increase robustness of coverage with beam switching over the antenna modules.

Beamforming may be increasingly applied in large antenna systems, as use of higher frequency millimeter wave operating bands (e.g., FR4 and/or FR5) increases. For example, in a higher frequency millimeter wave operating band (e.g., FR4 and/FR5), a larger antenna system may be deployed in a network device, as compared with FR2, in a same size aperture. Furthermore, within FR2, larger antenna systems may also be deployed as the use of aperture constraint-less systems, such as intelligent reflecting surface (IRS) nodes, repeater nodes, and/or integrated access and backhaul (IAB) nodes, among other examples, increases.

In some examples, a UE (or other network device) may perform beamforming using a vector sum modulator phase shifting architecture. A vector sum modulator may include customizable phase shifters (e.g., a 360 degree phase is divided into $2^B$ levels/stages for a B-bit phase shifter) and/or customizable amplitude/gain control (e.g., with $B_{amp}$-bit gain control) over different antenna elements. For example, a vector sum modulator may utilize a 3 or a 5-bit phase shifter to optimize performance with cost. A vector sum modulator-based beamforming architecture may allow adaptability in beamforming codebooks. For example, in a vector sum modulator-based beamforming architecture, arbitrary beam weights that correspond to steerability of a beam's main lobe, adaptation of a beamwidth of the beam's main lobe, side lobe levels, and/or multi-beams, among other examples, can be achieved by using different beam weights (e.g., amplitudes and phases), without any change in the beamforming architecture, subject to quantization constraints alone.

In some examples, a UE (or other network device) may perform beamforming using a Butler matrix phase shifting architecture. The Butler matrix architecture may produce a set of fixed and orthogonal beams. For example, in a Butler matrix beamforming architecture, a set of possible beams may be a set of beams separated by progressive phase shifts (PPS) that steer the energy towards fixed, orthogonal directions. That is, only a finite number of steerable beam directions for the main lobe may be possible using a Butler matrix architecture. Furthermore, the PPS beams may have deterministic beamwidths, side lobe levels, and/or other beam properties (e.g., which may be dependent only on antenna dimensions). The Butler matrix architecture may allow for reduced flexibility/adaptability of beamforming, as compared to the vector sum modulator architecture since the beam properties cannot be adapted to channel conditions. However, the Butler matrix architecture may conserve space/area on a semiconductor chip, and may reduce power consumption and generation of thermal energy, as compared to the vector sum modulator architecture, especially as the carrier frequency increases.

In some examples, a UE (or other network device) may perform beamforming using other beamforming architectures (e.g., a Rotman or a Luneberg lens array) with different levels of customizability.

Figure 3A:
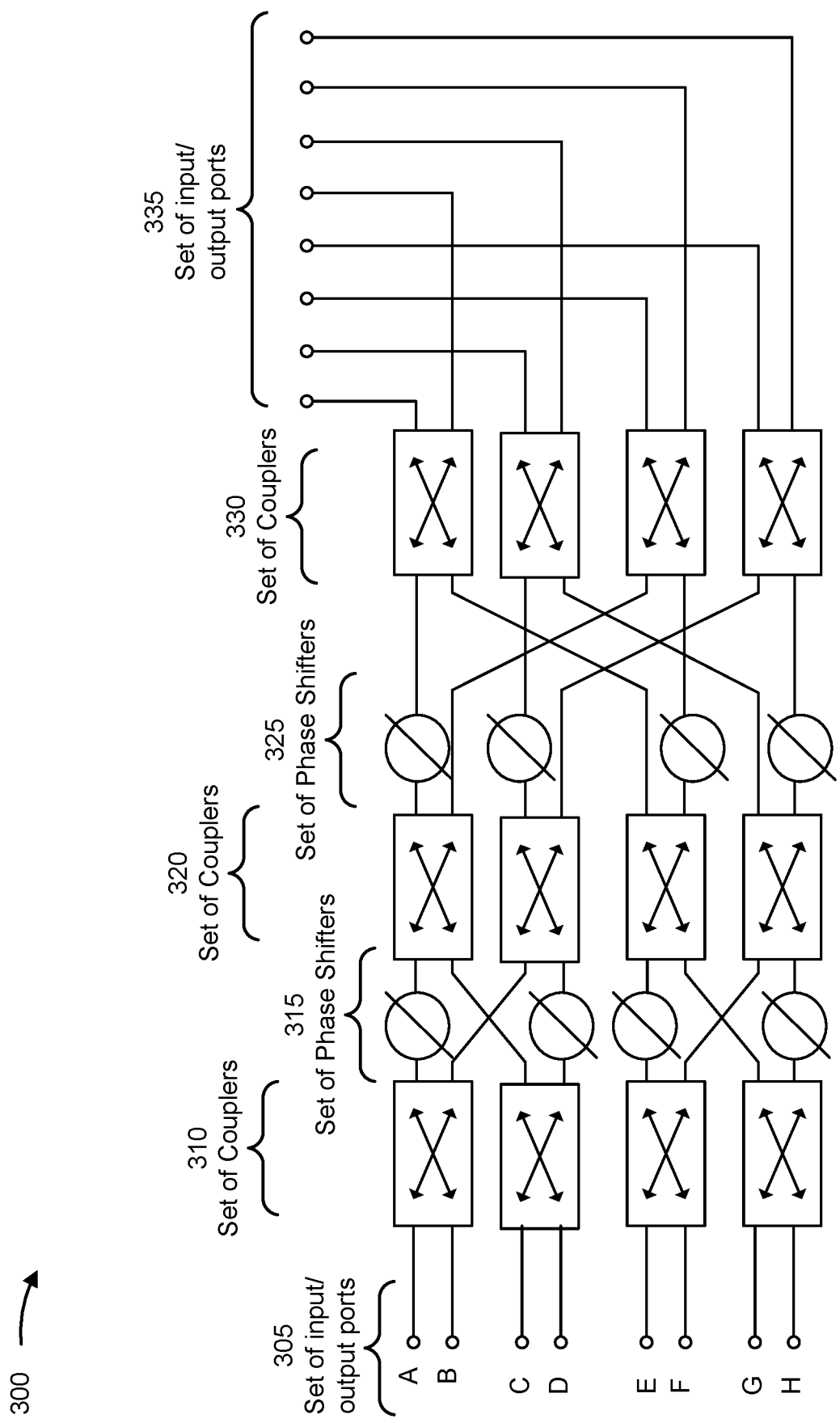
FIG. 3A is a diagram illustrating an example of a Butler matrix, in accordance with the present disclosure.

FIG. 3A is a diagram illustrating an example of a Butler matrix 300, in accordance with the present disclosure. A Butler matrix architecture may conserve space/area on a semiconductor chip as well as power during beamforming operations of a network device (e.g., a UE, a base station, an IRS node, a repeater node, or an IAB node). For example, a network device may use a Butler matrix architecture to communicate via a set of beams (e.g., a static set of beams) over millimeter wave bands and/or sub-terahertz frequencies.

The Butler matrix 300 includes a set of input/output ports 305 that can receive signals on which the Butler matrix 300 operates and/or provide signals to another component (e.g., an antenna or a frontend component, among other examples) after the Butler matrix 300 operates on the signals. In a three stage Butler matrix architecture with 8 input/output ports, as shown in FIG. 3A, the set of input/output ports 305 are connected to a set of hybrid couplers 310, a set of phase shifters 315, a set of hybrid couplers 320, a set of phase shifters 325, a set of hybrid couplers 330, and/or a set of input/output ports 335. The sets of hybrid couplers 310, 320, 330 may provide connections that change an order of signals within the Butler matrix, such that an order (e.g., from top to bottom) at the set of input/output ports 305 is different from an order (e.g., from left to right) at the set of input/output ports 335. The sets of phase shifters 315, 325 may change phase shifts of signals within the Butler matrix, with each phase shifter having a fixed phase shift. For example, the set of phase shifters 315 may include phase shifters that shift phases by −67.5 degrees and phase shifters that shift phases by −22.5 degrees. The set of phase shifters 325 may include phase shifters that shift phases by −45 degrees.

In this way, the Butler matrix 300 may use circuitry to form a static set of beams through which a network device may communicate. The Butler matrix 300 has a first number of input ports (e.g., 2, 4, 8, etc.) where a signal is applied (e.g., received) and a second number of output ports (e.g., 2, 4, 8, etc.). The input ports may be coupled to antenna elements, or the output ports may be coupled to the antenna elements. The Butler matrix 300 may be configured to operate in both directions (e.g., a set of ports functions as input ports in a receive direction and as output ports in a transmit direction). For example, the set of input/output ports 335 may be coupled to a respective set of antenna elements. In the transmit direction, the set of input/output ports 305 may be the input ports, and the set of input/output ports 335 may be the output ports. In this case, one or more signals (e.g., signals A, B, C, D, E, F, G, and/or H) may be input to the set of input/output ports 305. The one or more signals may be processed by the sets of hybrid couplers 310, 320, 330 and the sets of phase shifters 315, 325 and output by the set of input/output ports 335 to the respective set of antenna elements. In the receive direction, the set of input/output ports 335 may be the input ports, and the set of input/output ports may be the output ports. In this case, signals received by the antenna elements may be input to the set of input/output ports 335, processed by the sets of hybrid couplers 310, 320, 330 and the sets of phase shifters 315, 325 and output by the set of input/output ports 305 (e.g., to a frontend component of the network device).

The Butler matrix may include $(N/2)*\log_2(N)$ hybrid couplers and $(N/2)*(\log_2(N)-1)$ fixed value phase shifters, where N is a number of input ports. In some examples, N may be a power of (e.g., 2, 4, 8, etc.). As shown in FIG. 3, the Butler matrix may be configured with 8 input ports, such that N=8. In this case, the Butler matrix includes 12 hybrid couplers and 8 fixed value phase shifters.

The Butler matrix supports communication over a number of beams that may be equal to a number of input/output ports of the Butler matrix. The beams may be fixed, orthogonal, and simultaneously steerable. In this way, the Butler matrix may conserve power and semiconductor chip space when compared to beamforming hardware that includes a set of phase shifters that may be configured to apply variable phase shifts (e.g., as in a vector sum modulator architecture) and may be configurable to communicate using an increased number of beams. The area/space savings comes from the capability of a Butler matrix to simultaneously steer multiple beams with the same set of circuit components, which in the case of a vector sum modulator architecture requires the replication of hardware components for each steerable beam. However, the base station and the UE may not be synchronized regarding a type of beamforming configuration that is supported by the UE. For example, if the UE supports a relatively small set of fixed beams for communicating with a base station, and the base station expects the UE to support a relatively large set of beams, the base station may communicate using a narrow beam, and the UE may fail to receive communications from the base station. This may cause the UE and/or the base station to consume power, communication, latency, computing, and/or network resources to detect and/or correct communication errors.

As indicated above, FIG. 3A is provided as an example. Other examples may differ from what is described with regard to FIG. 3A.

Figure 3B:
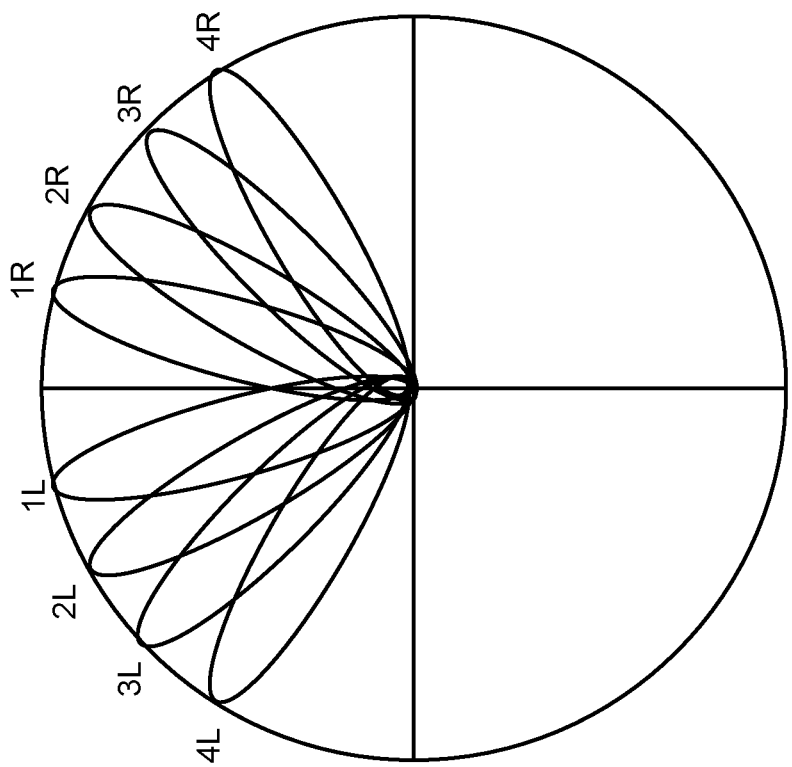
FIG. 3B is a diagram illustrating an example of beams formed using the Butler matrix of FIG. 3A, in accordance with the present disclosure.

FIG. 3B is a diagram illustrating an example 350 of beams formed using the Butler matrix 300 of FIG. 3A, in accordance with the present disclosure. As shown in FIG. 3B, the Butler matrix forms a static set of beams (1L, 2L, 3L, 4L, 1R, 2R, 3R, and 4R) through which a network device may communicate. In the transmit direction, each input port in the set of input/output ports 305 corresponds to a respective beam in the set of beams. A signal (e.g., A, B, C, D, E, F, G or H) input to an input port is processed by the sets of hybrid couplers 310, 320, 330 and the sets of phase shifters 315, 325, and is thus output from the output ports in the set of input/output ports 335 to the respective antenna elements at different phase offsets, resulting in transmission in a beam direction associated with a respective beam in the set of beams. For example, beam 1L may be formed from signal A, beam 2L may be formed from signal E, beam 3L may be formed from signal C, beam 4L may be formed from signal G, beam 1R may be formed from signal H, beam 2R may be formed from signal D, beam 3R may be formed from signal F, and beam 4R may be formed from signal B. The beams (1L, 2L, 3L, 4L, 1R, 2R, 3R, and 4R) may be fixed, orthogonal, and simultaneously steerable.

As indicated above, FIG. 3B is provided as an example. Other examples may differ from what is described with respect to FIG. 3B.

As described above, UEs and/or other network devices may use different beamforming architectures. In some cases, such as if a single antenna module or radio frequency integrated circuit (RFIC) is selected for a UE, which beamforming architecture is used at the UE may depend on antenna array size, carrier frequency, the type of superheterodyne architecture used including the intermediate carrier frequency, a need for flexibility in beamforming capabilities (e.g., based at least in part on use cases supported by the UE, applications that are optimized for by the UE, etc.), chip area needed for the beamforming architecture, and/or power consumption and/or thermal energy generation tradeoffs, among other examples. In some examples, UEs (and/or other network devices) with large antenna arrays may utilize Butler matrix architectures to conserve space on a semiconductor chip and reduce power consumption and thermal energy, as compared to vector sum modulator architectures.

In some aspects, a UE (or other network device) may utilize a beamforming architecture that includes an antenna array arranged in a number of blocks of antenna elements, and each block of antenna elements may be associated with a respective Butler matrix. In this way, the UE (or other network device) may reduce space on a semiconductor chip, power consumption, and thermal energy, as compared to a vector sum modulator architecture, with increased beamforming flexibility, as compared to single Butler matrix architecture. However, different UEs may use different beamforming architectures with different beamforming capabilities, and the base station and the UE may not be synchronized regarding the capability of the beamforming architecture of the UE. For example, if the UE supports a relatively small set of fixed beams for communicating with the base station, and the base station expects the UE to support a relatively large set of beams, the base station may communicate using a narrow beam, and the UE may fail to receive communications from the base station. This may cause the UE and/or the base station to consume power, communication, latency, computing, and/or network resources to detect and/or correct communication errors.

Some techniques and apparatuses described herein enable a network device (e.g., a UE or other network device) to transmit, to a base station, an indication of a capability of the beamforming architecture of the network device. The network device and the base station may communicate based at least in part on the capability of the beamforming architecture of the network device. For example, the base station may determine a beamwidth, a transmit power, and/or one or more other properties for communications (e.g., downlink and/or uplink communications) between the base station and the network device based at least in part on the indication of the capability of the beamforming architecture received from the network device. As a result, communication errors between the base station and the network device may be reduced, which may decrease power consumption, communication latency, and/or consumption of computing and/or network resources associated with detecting and correcting communication errors. Furthermore, such signaling of the capability of the beamforming architecture may allow for increased use of Butler matrix based beamforming architectures, which may result in reduced space on a semi-conductor chip, reduced power consumption, and reduced thermal energy generation, particularly for network devices with large antenna arrays.

FIG. 4 is a diagram illustrating examples 400 and 410 associated with beamforming architecture configurations for a network device, in accordance with the present disclosure.

In some aspects, the network device may be a UE. In some aspects, the network device may be an IRS node, a repeater node, or an IAB node.

In some aspects, a beamforming architecture of the network device may include an antenna array or panel that includes a plurality of antenna elements, and the antenna array or panel may be arranged into a plurality of blocks of antenna elements, with each block of the plurality of blocks being associated with a respective Butler matrix beamforming architecture. The Butler matrix beamforming architectures may be implemented using radio frequency (RF) circuitry, such as the Butler matrix architecture shown in FIG. 3A. In some aspects, a $2^N \times 2^M$ planar array of antenna elements may include a plurality of blocks of $2^P$ antenna elements, where each block is controlled by a respective Butler matrix beamforming architecture that produces fixed sets of beam weights. The fixed sets of beam weights produced by each Butler matrix beamforming architecture may be associated with a respective set of static beams that can be formed by the set of $2^P$ antenna elements controlled by that Butler matrix beamforming architecture. In the case in which each block includes $2^P$ antenna elements, the $2^N \times 2^M$ planar array may include $2^{N+M-P}$ blocks of antenna elements. For example, an 8×4 array of antenna elements (e.g., N=3, M=2) designed with a Butler matrix block size of 8 (e.g., P=3) may include 4 blocks of antenna elements (e.g., 4 blocks, each having 8 antenna elements, with each block of 8 antenna elements being controlled by a respective Butler matrix).

In some aspects, for an antenna array or panel having a certain number of antenna elements, there may be multiple arrangements of the antenna elements into the plurality of blocks that are controlled by respective Butler matrix beamforming architectures. As shown in FIG. 4, example 400 shows an arrangement of the antenna elements in an 8×4 array into a plurality of blocks according to a first configuration, and example 410 shows an arrangement of the antenna elements in an 8×4 array into a plurality of blocks according to a second configuration. The first and second configurations may result in different constraints on the type of beam weights possible and the realizable gains possible in different beam directions. In some aspects, other configurations may be possible as well.

As shown in example 400, in the first configuration, the 8×4 array of antenna elements is arranged into 4 blocks 405a, 405b, 405c, and 405d, with each block 405a, 405b, 405c, and 405d including 8 antenna elements arranged in a 4×2 configuration. Each block 405a, 405b, 405c, and 405d may be controlled by a respective Butler matrix beamforming architecture that produces respective fixed sets of beam weights. For example, using the respective Butler matrix beamforming architecture associated with each 4×2 block 405a, 405b, 405c, and 405d, the network device may be capable of forming a respective static/fixed set of beams with the antenna elements in each block 405a, 405b, 405c, and 405d.

As shown in example 410, in the second configuration, the 8×4 array of antenna elements are arranged into 4 blocks 415a, 415b, 415c, and 415d, with each block 415a, 415b, 415c, and 415d including 8 antenna elements arranged in a 2×4 configuration. Each block 415a, 415b, 415c, and 415d may be controlled by a respective Butler matrix beamforming architecture that produces respective fixed sets of beam weights. For example, using the respective Butler matrix beamforming architecture associated with each 2×4 block 415a, 415b, 415c, and 415d, the network device may be capable of forming a respective static/fixed set of beams with the antenna elements in each block 415a, 415b, 415c, and 415d.

As indicated above, FIG. 4 is provided as an example. Other examples may differ from what is described with respect to FIG. 4.

Figure 5:
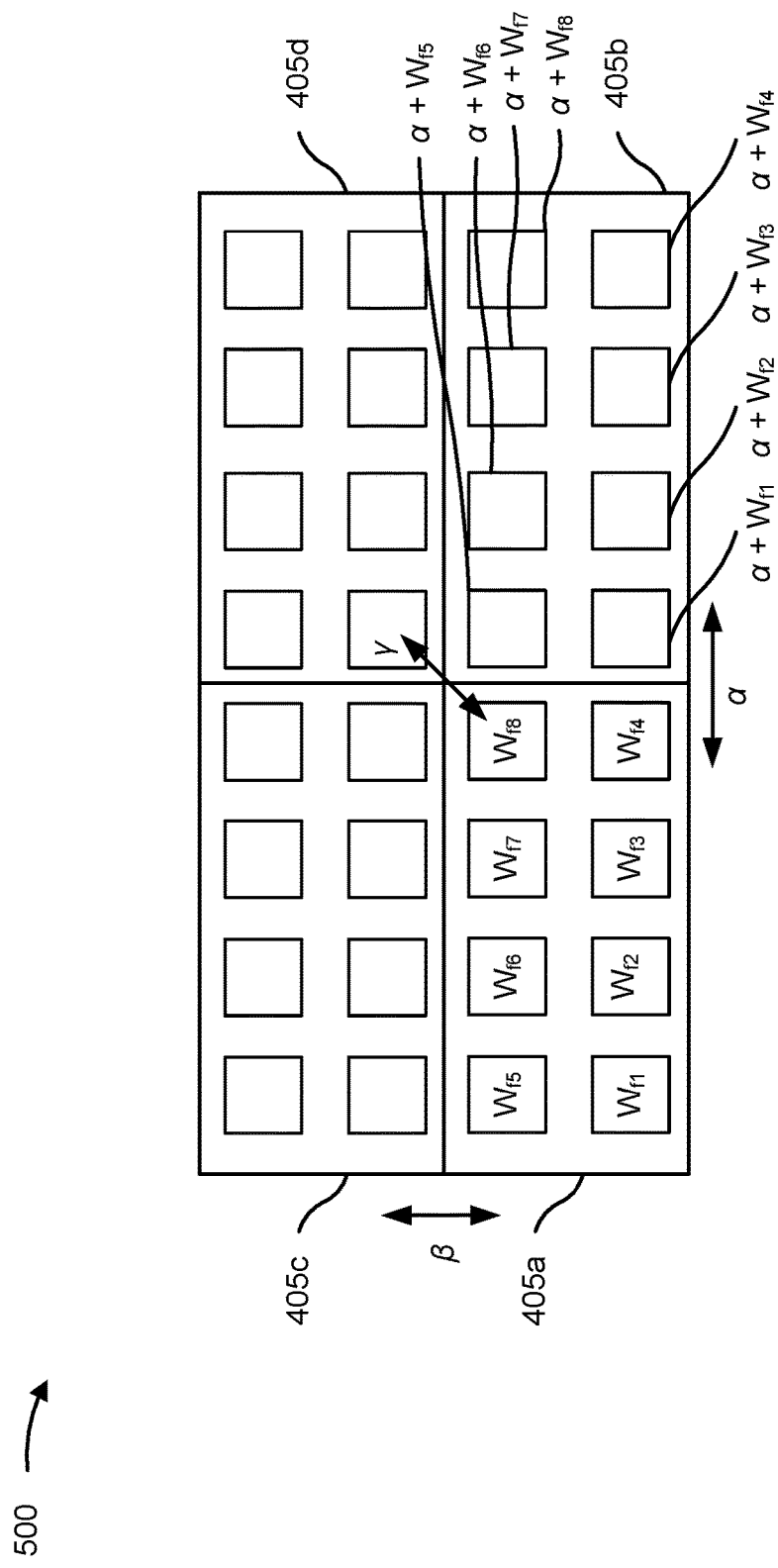

FIG. 5 is a diagram illustrating an example 500 associated with a beamforming architecture configuration for a network device, in accordance with the present disclosure. In some aspects, the network device may be a UE. In some aspects, the network device may be an IRS node, a repeater node, or an IAB node.

As described above in connection with FIG. 4, the beamforming architecture of the network device may include an antenna array or panel that includes a plurality of antenna elements, and the antenna array or panel may be arranged into a plurality of blocks of antenna elements, with each block of the plurality of blocks being associated with a respective Butler matrix beamforming architecture. In some aspects, the beamforming architecture of the network device may be configured to apply phase offset quantization across different blocks of the plurality of blocks of antenna elements. In this case, a phase quantization level may be applied across the antenna elements in a first block of antenna elements and a second block of antenna elements. The phase quantization level may be a phase offset between the fixed sets of beams weights associated with the first block of antenna elements and the fixed set of beam weights associated with the second block of antenna elements. In some aspects, a different phase quantization level may be applied between a first block of antenna elements, and each other block of antenna elements in the antenna array or panel.

As shown in FIG. 5, example 500 shows an example of phase offset quantization for the first configuration of an 8×4 array of antenna elements shown in example 400 of FIG. 4. As shown in FIG. 5, a first phase quantization level $\alpha$ may be applied between a first block 405a and a second block 405b. The antenna elements in the first block 405a, as controlled by the respective Butler matrix beamforming architecture associated with the first block 405a, may produce fixed sets of beam weights (e.g., a respective fixed set of beam weights for each of the 8 possible beams that can be formed by the antenna elements in the first block 405a). The first phase quantization level $\alpha$ may indicate a phase offset that is applied, across all of the antenna elements in the first block 405a and the second block 405b, such that the fixed sets of beam weights for the antenna elements in the second block 405b are offset by a from the fixed sets of beam weights for corresponding antenna elements in the first block 405a. For example, first phase quantization level $\alpha$ may be applied to respective beam weights of $W_{f1}$, $W_{f2}$, $W_{f3}$, $W_{f4}$, $W_{f5}$, $W_{f6}$, $W_{f7}$, and $W_{f8}$, for the 8 antenna elements in the first block 405a, to generate respective beam weights of $\alpha+W_{f1}$, $\alpha+W_{f2}$, $\alpha+W_{f3}$, $\alpha+W_{f4}$, $\alpha+W_{f5}$, $\alpha+W_{f6}$, $\alpha+W_{f7}$, and $\alpha+W_{f8}$ for the 8 antenna elements in the second block 405b.

As further shown in FIG. 5, a second phase quantization level $\beta$ may be applied between the first block 405a and a third block 405c. The second phase quantization level $\beta$ may indicate a phase offset that is applied, across all of the antenna elements in the first block 405a and the third block 405c, such that the fixed sets of beam weights for the antenna elements in the third block 405c are offset by $\beta$ from the fixed sets of beam weights for corresponding antenna elements in the first block 405a. For example, second phase quantization level $\beta$ may be applied to the respective beam weights of $W_{f1}$, $W_{f2}$, $W_{f3}$, $W_{f4}$, $W_{f5}$, $W_{f6}$, $W_{f7}$, and $W_{f8}$, for the 8 antenna elements in the first block 405a, to generate respective beam weights of $\beta+W_{f1}$, $\beta+W_{f2}$, $\beta+W_{f3}$, $\beta+W_{f4}$, $\beta+W_{f5}$, $\beta+W_{f6}$, $\beta+W_{f7}$, and $\beta+W_{f8}$ for the 8 antenna elements in the third block 405.

As further shown in FIG. 5, a third phase quantization level $\gamma$ may be applied between the first block 405a and a fourth block 405d. The third phase quantization level $\beta$ may indicate a phase offset that is applied, across all of the antenna elements in the first block 405a and the fourth block 405d, such that the fixed sets of beam weights for the antenna elements in the fourth block 405d are offset by $\gamma$ from the fixed sets of beam weights for corresponding antenna elements in the first block 405a. For example, third phase quantization level $\gamma$ may be applied to the respective beam weights of $W_{f1}$, $W_{f2}$, $W_{f3}$, $W_{f4}$, $W_{f5}$, $W_{f6}$, $W_{f7}$, and $W_{f8}$, for the 8 antenna elements in the first block 405a, to generate respective beam weights of $\gamma+W_{f1}$, $\gamma+W_{f2}$, $\gamma+W_{f3}$, $\gamma+W_{f4}$, $\gamma+W_{f5}$, $\gamma+W_{f6}$, $\gamma+W_{f7}$, and $\gamma+W_{f8}$ for the 8 antenna elements in the fourth block 405d.

In some aspects, the phase quantization levels (e.g., $\alpha$, $\beta$, and $\gamma$) may be used to generate different fixed/static sets of possible beams with the different blocks associated with the respective Butler matrix beamforming architectures. For example, in the case of the 8×4 array of antenna elements, the phase quantization levels (e.g., $\alpha$, $\beta$, and $\gamma$) may be used to control the 4 blocks of antenna elements to generate different sets of 8 beams, resulting in a total set of 32 beams that can be formed by the beamforming architecture of the network device. In some aspects, phase quantization levels (e.g., $\alpha$, $\beta$, and $\gamma$) may control the different blocks of antenna elements to generate beams with different beam directions and/or beam properties (e.g., beamwidths and/or side lobe levels, among other examples).

As indicated above, FIG. 5 is provided as an example. Other examples may differ from what is described with respect to FIG. 5.

Figure 6:
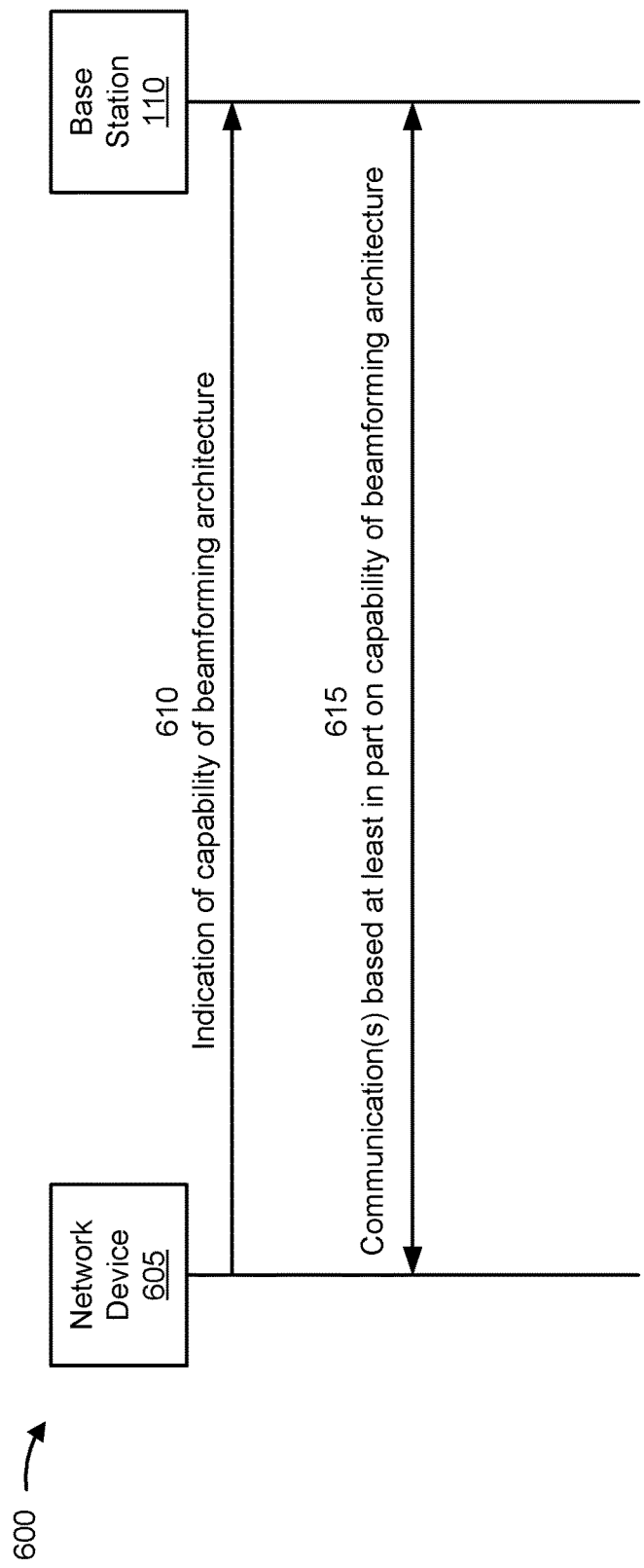
FIG. 6 is a diagram illustrating an example associated with beamforming architecture capability signaling, in accordance with the present disclosure.

FIG. 6 is a diagram illustrating an example 600 associated with beamforming architecture capability signaling, in accordance with the present disclosure. As shown in FIG. 6, example 600 includes communication between a base station 110 and a network device 605. In some aspects, the base station 110 and the network device 605 may be included in a wireless network, such as wireless network 100. The base station 110 and the network device 605 may communicate via a wireless access link, which may include an uplink and a downlink. In some aspects, the network device 605 may be a UE (e.g., UE 120). In some aspects, the network device 605 may be another network device, such as an IRS node, an IAB node, or a repeater node.

As shown in FIG. 6, and by reference number 610, the network device 605 may transmit, to the base station 110, an indication of a capability of a beamforming architecture of the network device 605. The base station 110 may receive the indication of the capability of the beamforming architecture of the network device 605. In some aspects, the indication may include information relating to a structure of an antenna array or panel of the network device 605 and/or information relating to beamforming capabilities and/or constraints on beamforming possible with the beamforming architecture of the network device 605.

In some aspects, the indication of the capability of the beamforming architecture may include an indication of an RF circuitry related structure of an antenna array or panel of the beamforming architecture of the network device 605. For example, the antenna array or panel may include a plurality of blocks of antenna elements, with each block of the plurality of blocks associated with (e.g., controlled by) a respective Butler matrix beamforming architecture. In some aspects, the indication of the RF circuitry related structure may include an indication of a quantity (e.g., $2^{N+M-P}$) of blocks of antenna elements in the antenna array or panel (e.g., a quantity of the blocks that are controlled by respective Butler matrix beamforming architectures). Additionally, or alternatively, the indication of the RF circuitry related structure may include an indication of a quantity (e.g., $2^P=8$ or 16 as illustrative examples) of the antenna elements in each block (e.g., the quantity of antenna elements controlled by each Butler matrix beamforming architecture) and/or an arrangement (e.g., 4×2 or 2×4, among other examples) of the antenna elements in each block. In some aspects, the indication of the RF circuitry related structure may include a size of the antenna array (e.g., $2^N \times 2^M$) and/or other information about the structure of the antenna array or panel.

In some aspects, the indication of the capability of the beamforming architecture may include an indication of one or more phase offset quantization levels (e.g., $\alpha$, $\beta$, and $\gamma$) that are applied across the different blocks of antenna elements included in an antenna array of the beamforming architecture. For example, the one or more phase offset quantization levels may include a first phase offset quantization level (e.g., $\alpha$) that indicates an offset between beam weights of the antenna elements in a first block and beam weights of corresponding antenna elements in a second block, a second phase offset quantization level that indicates an offset between the beam weights of the antenna elements in the first block and beam weights of corresponding antenna elements in a third block, and/or a third phase offset quantization level that indicates an offset between the beam weights of the antenna elements in the first block and beam weights of corresponding antenna elements in a fourth block. In some aspects, the one or more quantization levels may include more or fewer quantization levels in accordance with a size of the antenna array and/or a number of blocks associated with respective Butler matrix beamforming architectures. Additionally, or alternatively, the indication of the capability of the beamforming architecture may include an indication of a number of fixed beams associated with each Butler matrix beamforming architecture or a granularity of phase offsets between the fixed beams associated with each respective Butler matrix beamforming architecture.

In some aspects, the base station 110 may determine, based at least in part on the information included in the capability indication, a total number of possible beams that the beamforming architecture of the network device 605 is capable of forming, a granularity of peak array gain directions of the beams that the beamforming architecture of the network device 605 is capable of forming, and/or one or more beam properties of the beams that the beamforming architecture of the network device 605 is capable of forming. For example, the one or more beam properties may include a set of possible scan directions, beamwidths, side lobe levels, and/or other beam properties.

In some aspects, the indication of the capability of the beamforming architecture may include an indication of a total number of possible beams that the beamforming architecture of the network device 605 is capable of forming. In some aspects, the indication of the capability of the beamforming architecture may include an indication of the granularity of peak array gain directions of the beams that the beamforming architecture of the network device 605 is capable of forming. In some aspects, the indication of the capability of the beamforming architecture may include an indication of one or more beam properties of the beams that the beamforming architecture of the network device 605 is capable of forming. For example, the one or more beam properties may include possible scan directions, beamwidths, side lobe levels, and/or other beam properties.

In some aspects, the network device 605 may transmit the indication of the capability of the beamforming architecture in a radio resource control (RRC) message or a medium access control (MAC) control element (MAC-CE). In some aspects, the network device 605 may include the indication of the capability of the beamforming architecture in a capability report that includes other capability information associated with the network device 605. In this case, the capability report may include one or more additional bit fields dedicated to providing the indication of the capability of the beamforming architecture. In some aspects, the network device 605 may transmit, the indication of the capability of the beamforming architecture in a capability message dedicated for providing the indication of the capability of the beamforming architecture.

As further shown in FIG. 6, and by reference number 615, the network device 605 and the base station 110 may communicate with each other based at least in part on the capability of the beamforming architecture of network device 605. In some aspects, the base station 110 may transmit, and the network device 605 may receive, communications (e.g., downlink communications) based at least in part on the capability of the beamforming architecture of network device 605. In some aspects, the network device 605 may transmit, and the base station 110 may receive, communications (e.g., uplink communications) based at least in part on the capability of the beamforming architecture of network device 605.

In some aspects, the base station 110 may determine, based at least in part on the information included in the capability indication, the total number of possible beams that the beamforming architecture of the network device 605 is capable of forming, the granularity of peak array gain directions of the beams that the beamforming architecture of the network device 605 is capable of forming, and/or one or more beam properties (e.g., possible scan directions, beamwidths, and/or side lobe levels) of the beams that the beamforming architecture of the network device 605 is capable of forming. In some aspects, the capability indication may indicate the total number of possible beams that the beamforming architecture of the network device 605 is capable of forming, the granularity of peak array gain directions of the beams that the beamforming architecture of the network device 605 is capable of forming, and/or one or more beam properties (e.g., possible scan directions, beamwidths, and/or side lobe levels) of the beams that the beamforming architecture of the network device 605 is capable of forming. In some aspects, the base station 110 may determine transmit power levels and/or beamwidths for one or more communications to the network device 605 (e.g., downlink communications) and/or one or more communications to be received from the network device 605 (e.g., uplink communications) based at least in part on the information, included in and/or derived from the capability indication, such as such as the granularity of peak array directions and/or the beam properties of the possible beams that the network device 605 is capable of forming. For example, the base station 110 may determine a transmit power level, a beamwidth, and/or one or more other properties for a communication between the base station 110 and the network device 605 to satisfy one or more quality of service parameters associated with the communication, based at least in part on the granularity of peak array directions and/or the beam properties of the possible beams that the network device 605 is capable of forming.

In some aspects, the base station 110 may configure one or more beam directions associated with communications between the base station 110 and the network device 605 based at least in part on the information included in or derived from the capability indication. In this case, the network device 605 may transmit, to the network device 605, configuration information including a configuration of the one or more beam directions. The network device 605 may receive the configuration information and use the one or more beam directions for communications with the base station 110.

As described herein, the network device 605 may transmit, to the base station 110, an indication of a capability of the beamforming architecture of the network device 605. The network device 605 and the base station 110 may communicate based at least in part on the capability of the beamforming architecture of the network device 605. For example, the base station 110 may determine a beamwidth, a transmit power, and/or one or more other properties for communications (e.g., downlink and/or uplink communications) between the base station 110 and the network device 605 based at least in part on the indication of the capability of the beamforming architecture received from the network device 605. As a result, communication errors between the base station 110 and the network device 605 may be reduced, which may decrease power consumption, communication latency, and/or consumption of computing and/or network resources associated with detecting and correcting communication errors. Furthermore, such signaling of the capability of the beamforming architecture may allow for increased use of Butler matrix based beamforming architectures, which may result in reduced space on a semi-conductor chip, reduced power consumption, and reduced thermal energy generation, particularly for a network device 605 with a large antenna array.

As indicated above, FIG. 6 is provided as an example. Other examples may differ from what is described with respect to FIG. 6.

Figure 7:
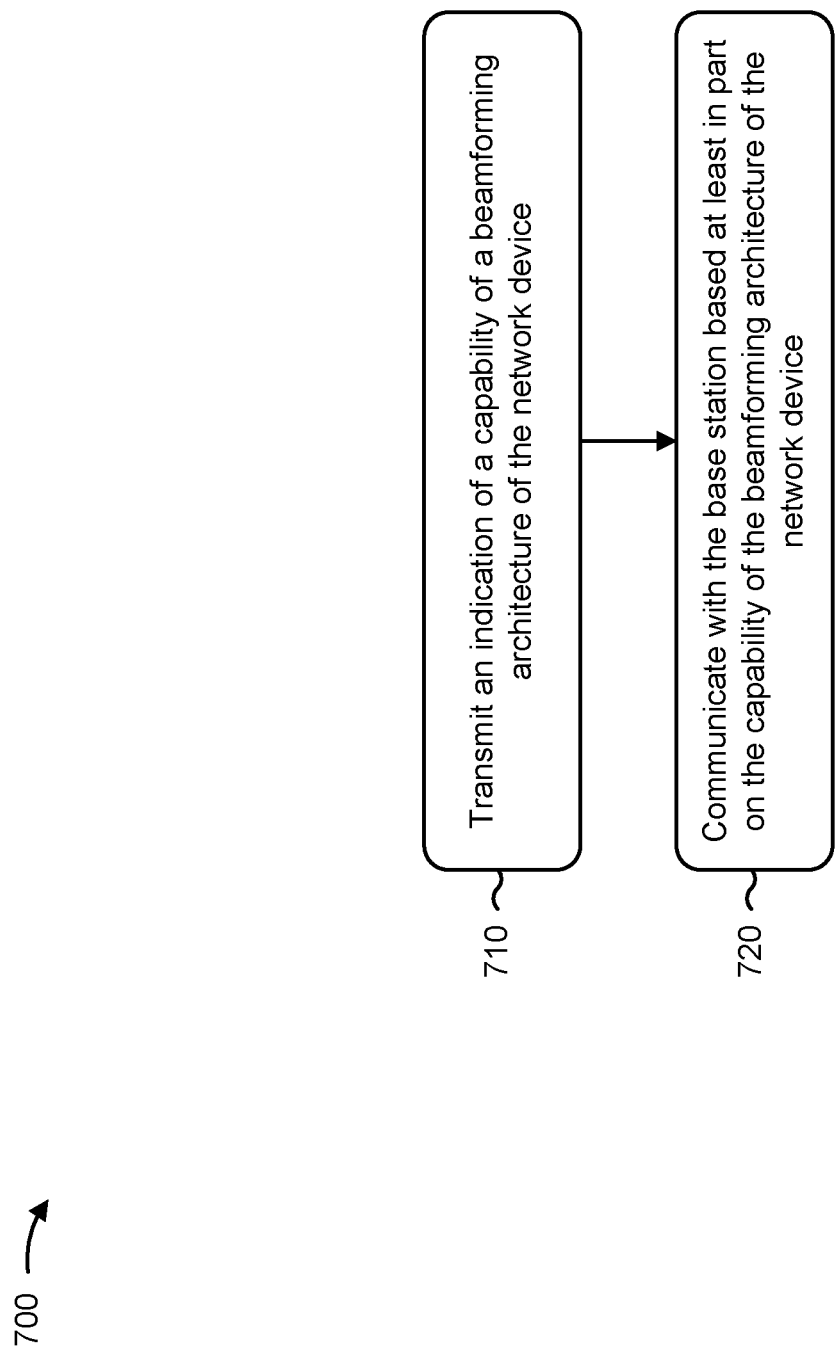
FIGS. 7-8 are diagrams illustrating example processes associated with beamforming architecture capability signaling, in accordance with the present disclosure.

FIG. 7 is a diagram illustrating an example process 700 performed, for example, by a network device, in accordance with the present disclosure. Example process 700 is an example where the network device (e.g., network device 605) performs operations associated with beamforming architecture capability signaling.

As shown in FIG. 7, in some aspects, process 700 may include transmitting, to a base station, an indication of a capability of a beamforming architecture of the network device (block 710). For example, the network device (e.g., using communication manager 920 and/or transmission component 904, depicted in FIG. 9) may transmit, to a base station, an indication of a capability of a beamforming architecture of the network device, as described above.

As further shown in FIG. 7, in some aspects, process 700 may include communicating with the base station based at least in part on the capability of the beamforming architecture of the network device (block 720). For example, the network device (e.g., using communication manager 920, reception component 902, and/or transmission component 904, depicted in FIG. 9) may communicate with the base station based at least in part on the capability of the beamforming architecture of the network device, as described above.

Process 700 may include additional aspects, such as any single aspect or any combination of aspects described below and/or in connection with one or more other processes described elsewhere herein.

In a first aspect, the indication includes an indication of an RF circuitry related structure of an antenna array or panel of the beamforming architecture.

In a second aspect, the indication of the RF circuitry related structure of the antenna array includes an indication of a quantity of blocks of antenna elements in the antenna array, and each block of the quantity of blocks is associated with a respective Butler matrix beamforming architecture.

In a third aspect, the indication of the RF circuitry related structure of the antenna array further includes an indication of a quantity of the antenna elements in each block of the quantity of blocks in the antenna array.

In a fourth aspect, the indication of the RF circuitry related structure of the antenna array further includes an indication of an arrangement of the antenna elements in each block of the quantity of blocks in the antenna array.

In a fifth aspect, the indication includes an indication of one or more phase offset quantization levels across different blocks of antenna elements included in an antenna array of the beamforming architecture, and each block of the different blocks of antenna elements is associated with a respective Butler matrix beamforming architecture.

In a sixth aspect, the indication of the capability of the beamforming architecture further includes at least one of an indication of a number of fixed beams associated with the respective Butler matrix beamforming architecture associated with each block of the different blocks of the antenna array or a granularity of phase offsets between the fixed beams associated with the respective Butler matrix beamforming architecture associated with each block of the different blocks of the antenna array.

In a seventh aspect, the indication includes an indication of a granularity of peak array gain directions of a set of beams that the beamforming architecture is capable of forming.

In an eighth aspect, the indication includes an indication of one or more beam properties associated with a set of beams that the beamforming architecture is capable of forming, and the one or more beam properties include at least one of possible scan directions, beamwidths, or side lobe levels.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
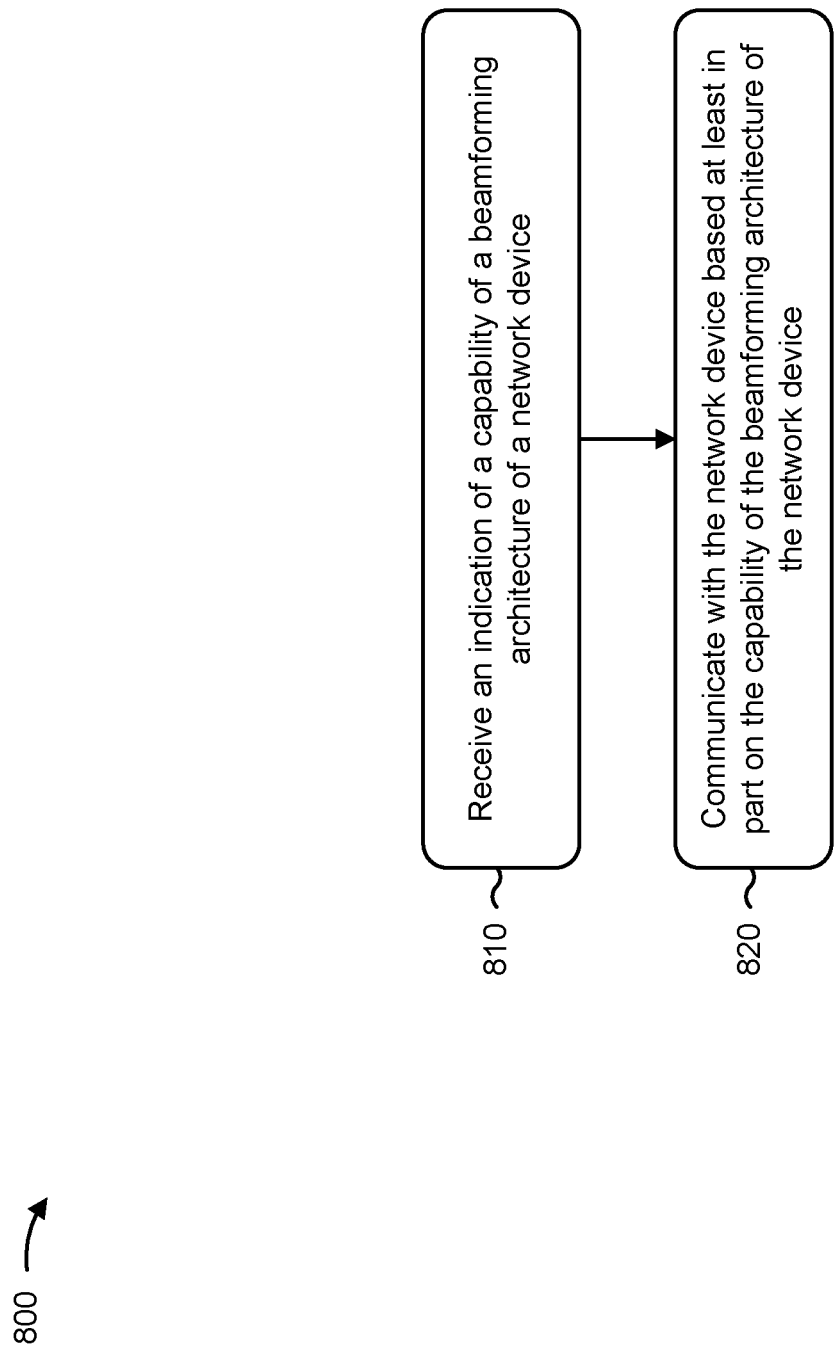

FIG. 8 is a diagram illustrating an example process 800 performed, for example, by a base station, in accordance with the present disclosure. Example process 800 is an example where the base station (e.g., base station 110) performs operations associated with beamforming architecture capability signaling.

As shown in FIG. 8, in some aspects, process 800 may include receiving, from a network device, an indication of a capability of a beamforming architecture of the network device (block 810). For example, the base station (e.g., using communication manager 150 and/or reception component 1002, depicted in FIG. 10) may receive, from a network device, an indication of a capability of a beamforming architecture of the network device, as described above.

As further shown in FIG. 8, in some aspects, process 800 may include communicating with the network device based at least in part on the capability of the beamforming architecture of the network device (block 820). For example, the base station (e.g., using communication manager 150, reception component 1002, and/or transmission component 1004, depicted in FIG. 10) may communicate with the network device based at least in part on the capability of the beamforming architecture of the network device, as described above.

Process 800 may include additional aspects, such as any single aspect or any combination of aspects described below and/or in connection with one or more other processes described elsewhere herein.

In a first aspect, the indication includes an indication of an RF circuitry related structure of an antenna array or panel of the beamforming architecture.

In a second aspect, the indication of the RF circuitry related structure of the antenna array includes an indication of a quantity of blocks of antenna elements in the antenna array, and each block of the quantity of blocks is associated with a respective Butler matrix beamforming architecture.

In a third aspect, the indication of the RF circuitry related structure of the antenna array further includes an indication of a quantity of the antenna elements in each block of the quantity of blocks in the antenna array.

In a fourth aspect, the indication of the RF circuitry related structure of the antenna array further includes an indication of an arrangement of the antenna elements in each block of the quantity of blocks in the antenna array.

In a fifth aspect, the indication includes an indication of one or more phase offset quantization levels across different blocks of antenna elements included in an antenna array of the beamforming architecture, and each block of the different blocks of antenna elements is associated with a respective Butler matrix beamforming architecture.

In a sixth aspect, the indication of the capability of the beamforming architecture further includes at least one of an indication of a number of fixed beams associated with the respective Butler matrix beamforming architecture associated with each block of the different blocks of the antenna array or a granularity of phase offsets between the fixed beams associated with the respective Butler matrix beamforming architecture associated with each block of the different blocks of the antenna array.

In a seventh aspect, the indication includes an indication of a granularity of peak array gain directions of a set of beams that the beamforming architecture is capable of forming.

In an eighth aspect, the indication includes an indication of one or more beam properties associated with a set of beams that the beamforming architecture is capable of forming, and the one or more beam properties include at least one of possible scan directions, beamwidths, or side lobe levels.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
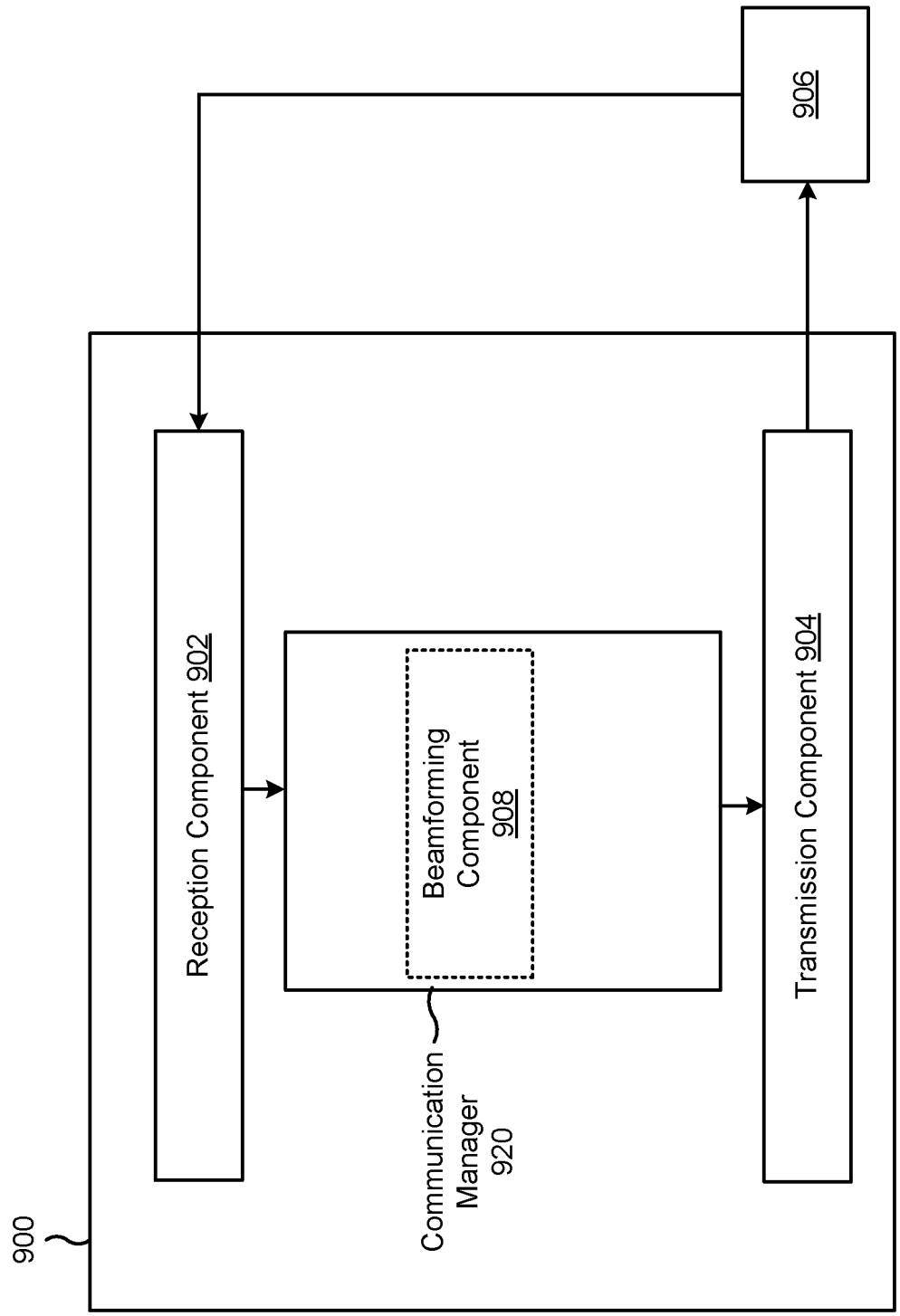
FIGS. 9-10 are diagrams of example apparatuses for wireless communication, in accordance with the present disclosure.

FIG. 9 is a diagram of an example apparatus 900 for wireless communication. The apparatus 900 may be a network device, or a network device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 920. The communication manager 920 may include a beamforming component 908.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network device described in connection with FIG. 2. In some aspects, the transmission component 904 may be co-located with the reception component 902 in a transceiver.

The transmission component 904 may transmit, to a base station, an indication of a capability of a beamforming architecture of the network device. The reception component 902 and/or the transmission component 904 may communicate with the base station based at least in part on the capability of the beamforming architecture of the network device. The beamforming component may for beams for communication with the base station.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
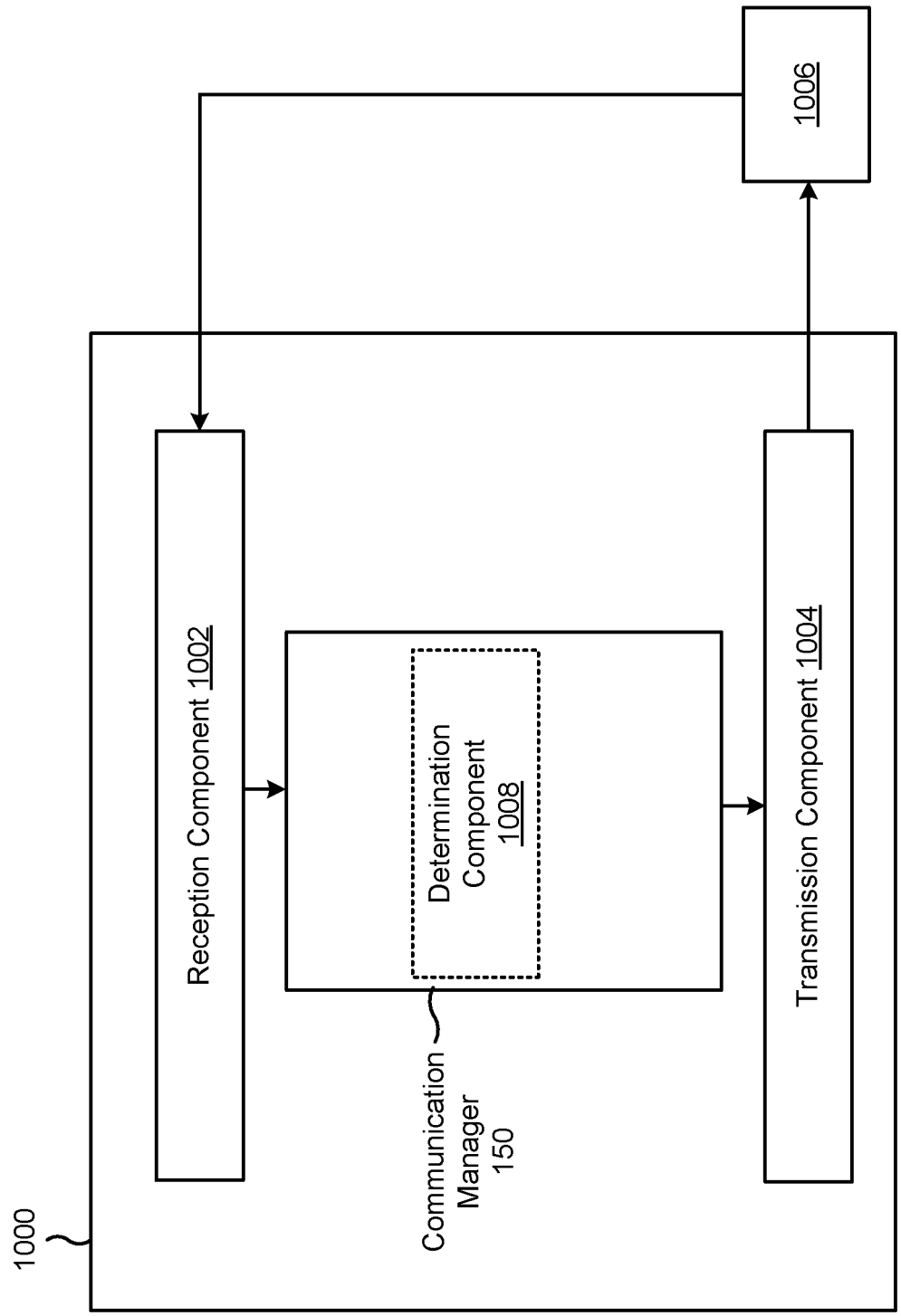

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive, from a network device, an indication of a capability of a beamforming architecture of the network device. The reception component 1002 and/or the transmission component 1004 may communicate with the network device based at least in part on the capability of the beamforming architecture of the network device. The determination component may determine one or more properties for communications between the base station and the network device based at least in part on the indication of the capability of the beamforming architecture of the network device.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network device, comprising: transmitting, to a base station, an indication of a capability of a beamforming architecture of the network device; and communicating with the base station based at least in part on the capability of the beamforming architecture of the network device.

Aspect 2: The method of Aspect 1, wherein the indication includes an indication of a radio frequency (RF) circuitry related structure of an antenna array or panel of the beamforming architecture.

Aspect 3: The method of Aspect 2, where the indication of the RF circuitry related structure of the antenna array includes an indication of a quantity of blocks of antenna elements in the antenna array, wherein each block of the quantity of blocks is associated with a respective Butler matrix beamforming architecture.

Aspect 4: The method of Aspect 3, wherein the indication of the RF circuitry related structure of the antenna array further includes an indication of a quantity of the antenna elements in each block of the quantity of blocks in the antenna array.

Aspect 5: The method of Aspect 4, wherein the indication of the RF circuitry related structure of the antenna array further includes an indication of an arrangement of the antenna elements in each block of the quantity of blocks in the antenna array.

Aspect 6: The method of any of Aspects 1-5, wherein the indication includes an indication of one or more phase offset quantization levels across different blocks of antenna elements included in an antenna array of the beamforming architecture, wherein each block of the different blocks of antenna elements is associated with a respective Butler matrix beamforming architecture.

Aspect 7: The method of Aspect 6, wherein the indication of the capability of the beamforming architecture further includes at least one of an indication of a number of fixed beams associated with the respective Butler matrix beamforming architecture associated with each block of the different blocks of the antenna array or a granularity of phase offsets between the fixed beams associated with the respective Butler matrix beamforming architecture associated with each block of the different blocks of the antenna array.

Aspect 8: The method of any of Aspects 1-7, wherein the indication includes an indication of a granularity of peak array gain directions of a set of beams that the beamforming architecture is capable of forming.

Aspect 9: The method of any of Aspects 1-8, wherein the indication includes an indication of one or more beam properties associated with a set of beams that the beamforming architecture is capable of forming, wherein the one or more beam properties include at least one of possible scan directions, beamwidths, or side lobe levels.

Aspect 10: A method of wireless communication performed by a base station, comprising: receiving, from a network device, an indication of a capability of a beamforming architecture of the network device; and communicating with the network device based at least in part on the capability of the beamforming architecture of the network device.

Aspect 11: The method of Aspect 10, wherein the indication includes an indication of a radio frequency (RF) circuitry related structure of an antenna array or panel of the beamforming architecture.

Aspect 12: The method of Aspect 11, where the indication of the RF circuitry related structure of the antenna array includes an indication of a quantity of blocks of antenna elements in the antenna array, wherein each block of the quantity of blocks is associated with a respective Butler matrix beamforming architecture.

Aspect 13: The method of Aspect 12, wherein the indication of the RF circuitry related structure of the antenna array further includes an indication of a quantity of the antenna elements in each block of the quantity of blocks in the antenna array.

Aspect 14: The method of Aspect 13, wherein the indication of the RF circuitry related structure of the antenna array further includes an indication of an arrangement of the antenna elements in each block of the quantity of blocks in the antenna array.

Aspect 15: The method of any of Aspects 10-14, wherein the indication includes an indication of one or more phase offset quantization levels across different blocks of antenna elements included in an antenna array of the beamforming architecture, wherein each block of the different blocks of antenna elements is associated with a respective Butler matrix beamforming architecture.

Aspect 16: The method of Aspect 15, wherein the indication of the capability of the beamforming architecture further includes at least one of an indication of a number of fixed beams associated with the respective Butler matrix beamforming architecture associated with each block of the different blocks of the antenna array or a granularity of phase offsets between the fixed beams associated with the respective Butler matrix beamforming architecture associated with each block of the different blocks of the antenna array.

Aspect 17: The method of any of Aspects 10-16, wherein the indication includes an indication of a granularity of peak array gain directions of a set of beams that the beamforming architecture is capable of forming.

Aspect 18: The method of any of Aspects 10-17, wherein the indication includes an indication of one or more beam properties associated with a set of beams that the beamforming architecture is capable of forming, wherein the one or more beam properties include at least one of possible scan directions, beamwidths, or side lobe levels.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device for wireless communication, comprising:

a memory; and
one or more processors, coupled to the memory, configured to:
transmit, to a base station, an indication of a capability of a beamforming architecture of the network device, wherein the indication includes an indication of one or more phase offset quantization levels across different blocks of antenna elements included in an antenna array of the beamforming architecture; and
communicate with the base station based at least in part on the capability of the beamforming architecture of the network device.

2. The network device of claim 1, wherein the indication includes an indication of a radio frequency (RF) circuitry related structure of an antenna array of the beamforming architecture.

3. The network device of claim 2, where the indication of the RF circuitry related structure of the antenna array includes an indication of a quantity of blocks of antenna elements in the antenna array, wherein each block of the quantity of blocks is associated with a respective Butler matrix beamforming architecture.

4. The network device of claim 3, wherein the indication of the RF circuitry related structure of the antenna array further includes an indication of a quantity of the antenna elements in each block of the quantity of blocks in the antenna array.

5. The network device of claim 4, wherein the indication of the RF circuitry related structure of the antenna array further includes an indication of an arrangement of the antenna elements in each block of the quantity of blocks in the antenna array.

6. The network device of claim 1, wherein each block of the different blocks of antenna elements is associated with a respective Butler matrix beamforming architecture.

7. The network device of claim 6, wherein the indication of the capability of the beamforming architecture further includes at least one of an indication of a number of fixed beams associated with the respective Butler matrix beamforming architecture associated with each block of the different blocks of the antenna array or a granularity of phase offsets between the fixed beams associated with the respective Butler matrix beamforming architecture with each block of the different blocks of the antenna array.

8. The network device of claim 1, wherein the indication includes an indication of a granularity of peak array gain directions of a set of beams that the beamforming architecture is capable of forming.

9. The network device of claim 1, wherein the indication includes an indication of one or more beam properties associated with a set of beams that the beamforming architecture is capable of forming, wherein the one or more beam properties include at least one of possible scan directions, beamwidths, or side lobe levels.

10. A base station for wireless communication, comprising:
a memory; and
one or more processors, coupled to the memory, configured to:
receive, from a network device, an indication of a capability of a beamforming architecture of the network device, wherein the indication includes an indication of one or more phase offset quantization levels across different blocks of antenna elements included in an antenna array of the beamforming architecture; and
communicate with the network device based at least in part on the capability of the beamforming architecture of the network device.

11. The base station of claim 10, wherein the indication includes an indication of a radio frequency (RF) circuitry related structure of an antenna array of the beamforming architecture.

12. The base station of claim 11, where the indication of the RF circuitry related structure of the antenna array includes an indication of a quantity of blocks of antenna elements in the antenna array, wherein each block of the quantity of blocks is associated with a respective Butler matrix beamforming architecture.

13. The base station of claim 12, wherein the indication of the RF circuitry related structure of the antenna array further includes an indication of a quantity of the antenna elements in each block of the quantity of blocks in the antenna array.

14. The base station of claim 13, wherein the indication of the RF circuitry related structure of the antenna array further includes an indication of an arrangement of the antenna elements in each block of the quantity of blocks in the antenna array.

15. The base station of claim 10, wherein each block of the different blocks of antenna elements is associated with a respective Butler matrix beamforming architecture.

16. The base station of claim 15, wherein the indication of the capability of the beamforming architecture further includes at least one of an indication of a number of fixed beams associated with the respective Butler matrix beamforming architecture associated with each block of the different blocks of the antenna array or a granularity of phase offsets between the fixed beams associated with the respective Butler matrix beamforming architecture associated with each block of the different blocks of the antenna array.

17. The base station of claim 10, wherein the indication includes an indication of a granularity of peak array gain directions of a set of beams that the beamforming architecture is capable of forming.

18. The base station of claim 10, wherein the indication includes an indication of one or more beam properties associated with a set of beams that the beamforming architecture is capable of forming, wherein the one or more beam properties include at least one of possible scan directions, beamwidths, or side lobe levels.

19. A method of wireless communication performed by a network device, comprising:
transmitting, to a base station, an indication of a capability of a beamforming architecture of the network device, wherein the indication includes an indication of one or more phase offset quantization levels across different blocks of antenna elements included in an antenna array of the beamforming architecture; and
communicating with the base station based at least in part on the capability of the beamforming architecture of the network device.

20. The method of claim 19, wherein the indication includes an indication of a radio frequency (RF) circuitry related structure of an antenna array of the beamforming architecture.

21. The method of claim 20, where the indication of the RF circuitry related structure of the antenna array includes an indication of a quantity of blocks of antenna elements in the antenna array, wherein each block of the quantity of blocks is associated with a respective Butler matrix beamforming architecture.

22. The method of claim 21, wherein the indication of the RF circuitry related structure of the antenna array further includes an indication of a quantity of the antenna elements in each block of the quantity of blocks in the antenna array.

23. The method of claim 22, wherein the indication of the RF circuitry related structure of the antenna array further includes an indication of an arrangement of the antenna elements in each block of the quantity of blocks in the antenna array.

24. The method of claim 19, wherein each block of the different blocks of antenna elements is associated with a respective Butler matrix beamforming architecture.

25. The method of claim 24, wherein the indication of the capability of the beamforming architecture further includes at least one of an indication of a number of fixed beams associated with the respective Butler matrix beamforming architecture associated with each block of the different blocks of the antenna array or a granularity of phase offsets between the fixed beams associated with the respective Butler matrix beamforming architecture associated with each block of the different blocks of the antenna array.

26. The method of claim 19, wherein the indication includes an indication of a granularity of peak array gain directions of a set of beams that the beamforming architecture is capable of forming.

27. The method of claim 19, wherein the indication includes an indication of one or more beam properties associated with a set of beams that the beamforming architecture is capable of forming, wherein the one or more beam properties include at least one of possible scan directions, beamwidths, or side lobe levels.

28. A method of wireless communication performed by a base station, comprising:
 receiving, from a network device, an indication of a capability of a beamforming architecture of the network device, wherein the indication includes an indication of one or more phase offset quantization levels across different blocks of antenna elements included in an antenna array of the beamforming architecture; and
 communicating with the network device based at least in part on the capability of the beamforming architecture of the network device.

29. The method of claim 28, wherein the indication includes an indication of a radio frequency (RF) circuitry related structure of an antenna array of the beamforming architecture.

30. The method of claim 29, where the indication of the RF circuitry related structure of the antenna array includes an indication of a quantity of blocks of antenna elements in the antenna array, wherein each block of the quantity of blocks is associated with a respective Butler matrix beamforming architecture.

* * * * *